US012401121B2

(12) United States Patent
Jin et al.

(10) Patent No.: US 12,401,121 B2
(45) Date of Patent: Aug. 26, 2025

(54) DUAL-POLARIZED ANTENNA AND ELECTRONIC DEVICE

(71) Applicants: Beijing BOE Sensor Technology Co., Ltd., Beijing (CN); BOE Technology Group Co., Ltd., Beijing (CN)

(72) Inventors: Yunnan Jin, Beijing (CN); Haoyang Zhang, Beijing (CN); Guohui Nan, Beijing (CN)

(73) Assignees: BEIJING BOE SENSOR TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/026,228

(22) PCT Filed: Apr. 25, 2022

(86) PCT No.: PCT/CN2022/089019
§ 371 (c)(1),
(2) Date: Mar. 14, 2023

(87) PCT Pub. No.: WO2023/206005
PCT Pub. Date: Nov. 2, 2023

(65) Prior Publication Data
US 2024/0304993 A1 Sep. 12, 2024

(51) Int. Cl.
*H01Q 5/48* (2015.01)
*H01Q 25/00* (2006.01)

(52) U.S. Cl.
CPC ............. *H01Q 5/48* (2015.01); *H01Q 25/001* (2013.01)

(58) Field of Classification Search
CPC .......... H01Q 5/48; H01Q 25/001; H01Q 1/36; H01Q 1/38; H01Q 1/48; H01Q 1/50; H01Q 21/24; H01Q 1/24
See application file for complete search history.

(56) References Cited

U.S. PATENT DOCUMENTS

| | | | |
|---|---|---|---|
| 2002/0163477 A1 | 11/2002 | Eriksson |
| 2020/0044327 A1 | 2/2020 | Ding et al. |
| 2020/0203830 A1 | 6/2020 | Tsuchiya et al. |
| 2022/0417350 A1 | 12/2022 | Lee et al. |

FOREIGN PATENT DOCUMENTS

| | | |
|---|---|---|
| CN | 206225538 U | 6/2017 |
| CN | 108063318 A | 5/2018 |
| CN | 110651396 A | 1/2020 |

(Continued)

*Primary Examiner* — Daniel D Chang
(74) *Attorney, Agent, or Firm* — WHDA, LLP

(57) ABSTRACT

A dual-polarized antenna and an electronic device, relates to the technical field of mobile communication. The dual-polarized antenna includes: a radiation unit including a first substrate and a radiation pattern disposed on a side of the first substrate; and a feed unit including a second substrate, wherein the second substrate is disposed on a side of the first substrate away from the radiation pattern; and the radiation unit is electrically connected to the feed unit. The present application provides a dual-polarized antenna with compact space, high structural stability and omni-directional coverage of signals on the horizontal plane by adopting a stacking structure.

18 Claims, 4 Drawing Sheets

(56) References Cited

FOREIGN PATENT DOCUMENTS

| | | | | |
|---|---|---|---|---|
| CN | 111009720 A | 4/2020 | | |
| CN | 210722787 U | 6/2020 | | |
| CN | 212303896 U | 1/2021 | | |
| CN | 112670703 A | 4/2021 | | |
| CN | 112928438 A | 6/2021 | | |
| CN | 113193339 A | 7/2021 | | |
| CN | 113241519 A | 8/2021 | | |
| CN | 113809556 A | * 12/2021 | ............. | H01Q 1/523 |
| CN | 215644995 U | 1/2022 | | |
| JP | 2003-289219 A | 10/2003 | | |

* cited by examiner

DUAL-POLARIZED ANTENNA AND ELECTRONIC DEVICE

TECHNICAL FIELD

The present application relates to the technical field of mobile communication and more particularly, to a dual-polarized antenna and an electronic device.

BACKGROUND

With the continuous development of mobile communication technology, for the new infrastructure of the fifth generation mobile communication technology, an antenna, as an indispensable component of mobile communication equipment, is applied more widely. In addition to higher electrical performance requirements for the antenna, the requirements for antenna profile and appearance are also increasing.

SUMMARY

The embodiments of the present application employ the following technical solutions:

in one aspect, the embodiment of the present application provides a dual-polarized antenna, including:

a radiation unit including a first substrate and a radiation pattern disposed on a side of the first substrate;

a feed unit including a second substrate, wherein the second substrate is disposed on a side of the first substrate away from the radiation pattern; and the radiation unit is electrically connected to the feed unit.

In an embodiment of the present application, the feed unit further includes a third substrate, the third substrate is disposed on a side of the radiation pattern away from the first substrate and is electrically connected to the second substrate.

In an embodiment of the present application, the radiation pattern includes a first radiation sub-pattern, a second radiation sub-pattern, a third radiation sub-pattern and a fourth radiation sub-pattern: the first radiation sub-pattern, the second radiation sub-pattern, the third radiation sub-pattern and the fourth radiation sub-pattern are located in a same plane, and have a gap between each other.

In an embodiment of the present application, a direction in which a geometric center of the first radiation sub-pattern points to a geometric center of the second radiation sub-pattern intersects with a direction in which a geometric center of the third radiation sub-pattern points to a geometric center of the fourth radiation sub-pattern.

In an embodiment of the present application, the first radiation sub-pattern is electrically connected to the second radiation sub-pattern through the feed unit; and the third radiation sub-pattern is electrically connected to the fourth radiation sub-pattern through the feed unit.

In an embodiment of the present application, the feed unit further includes a feeder group, the feeder group is electrically connected to the third substrate and the second substrate; and an extension direction of a feeder of the feeder group intersects with a plane where the radiation pattern is located.

In an embodiment of the present application, the feeder group includes a first feeder and a second feeder;

the first feeder passes through the third substrate and the first radiation sub-pattern, and the first feeder is electrically connected to the third substrate, the first radiation sub-pattern and the second substrate; and the second feeder passes through the third substrate and the third radiation sub-pattern, and the second feeder is electrically connected to the third substrate, the third radiation sub-pattern and the second substrate.

In an embodiment of the present application, the feed unit further includes a conductive column group and a connecting electrode group;

the conductive column group passes through the second substrate and the radiation pattern, and the conductive column group is electrically connected to the second substrate, the radiation pattern and the third substrate; and a plane where the connecting electrode group is located is parallel to a plane where the second substrate is located, and the connecting electrode group is electrically connected to the conductive column group, the second substrate and the feeder group.

In an embodiment of the present application, the conductive column group includes a first conductive column and a second conductive column; the connecting electrode group includes a first connecting electrode disposed on a side of the second substrate close to the radiation pattern, and a second connecting electrode disposed on a side of the second substrate away from the radiation pattern;

the first conductive column passes through the second substrate and the second radiation sub-pattern, the first conductive column is electrically connected to the second substrate, the second radiation sub-pattern and the third substrate: one end of the first connecting electrode is sleeved on the first conductive column and the other end of the first connecting electrode is sleeved on the first feeder, the first connecting electrode is electrically connected to the first conductive column, the second substrate and the first feeder; and the second conductive column passes through the second substrate and the fourth radiation sub-pattern, the second conductive column is electrically connected to the second substrate, the fourth radiation sub-pattern and the third substrate; one end of the second connecting electrode is sleeved on the second conductive column and the other end of the second connecting electrode is sleeved on the second feeder, the second connecting electrode is electrically connected to the second conductive column, the second substrate and the second feeder.

In an embodiment of the present application, the feed unit further includes a first pad group disposed on a side of the second substrate away from the radiation pattern and a second pad group disposed on a side of the second substrate close to the radiation pattern, and shapes of orthographic projections of the first pad group and the second pad group on the second substrate are annular;

the first pad group is sleeved on the first conductive column and the first feeder, and the first conductive column and the first feeder are electrically connected to the second substrate through the first pad group and the first connecting electrode; and the second pad group is sleeved on the second conductive column and the second feeder, and the second conductive column and the second feeder are electrically connected to the second substrate through the second pad group and the second connecting electrode.

In an embodiment of the present application, the feed unit further includes a third pad group disposed on a side of the third substrate away from the radiation pattern and a fourth pad group disposed on a side of the third substrate close to the radiation pattern, and shapes of orthographic projections of the third pad group and the fourth pad group on the second substrate are annular; and the third pad group and the fourth pad group are sleeved on the first conductive column, the second conductive column, the first feeder and the second feeder; and the first conductive column, the second conductive column, the first feeder and the second feeder are electrically connected to the third substrate through the third pad group and the fourth pad group.

In an embodiment of the present application, the radiation pattern includes a functional area and a non-functional area other than the functional area, and a gap is disposed between the functional area and the non-functional area; and the first radiation sub-pattern, the second radiation sub-pattern, the third radiation sub-pattern and the fourth radiation sub-pattern are disposed in the functional area.

In an embodiment of the present application, the first radiation sub-pattern, the second radiation sub-pattern, the third radiation sub-pattern and the fourth radiation sub-pattern are grid linear structures.

In an embodiment of the present application, the first radiation sub-pattern and the second radiation sub-pattern are disposed in a mirror symmetry; and the third radiation sub-pattern and the fourth radiation sub-pattern are disposed in a mirror symmetry; and shapes of the first radiation sub-pattern, the second radiation sub-pattern, the third radiation sub-pattern and the fourth radiation sub-pattern are the same.

In an embodiment of the present application, a shape of an orthographic projection of the first radiation sub-pattern on the first substrate includes a combination of a plurality of polygons.

In an embodiment of the present application, the shape of the orthographic projection of the first radiation sub-pattern on the first substrate includes a combination of rectangles with four incisal corners, a trapezoid and a triangle; and the rectangles with four incisal corners are connected to the triangle through the trapezoid.

In an embodiment of the present application, the non-functional area includes a plurality of dimming patterns arranged in array and disconnected from each other, and the dimming pattern includes a first conducting wire and a second conducting wire that are intersected with each other.

In an embodiment of the present application, the dual-polarized antenna further includes a fixed unit disposed on a side of the third substrate away from the radiation pattern, the fixed unit includes a first fixed structure and a second fixed structure, and the first fixed structure is sleeved on the feeder group; and the first fixed structure includes a first fixed part and a second fixed part that are connected with each other, an extension direction of the first fixed part is perpendicular to a plane where the second fixed part is located; and the second fixed structure is sleeved on a side of the first fixed part away from the feeder group and disposed on a side of the second fixed part away from the third substrate.

In an embodiment of the present application, the dual-polarized antenna further includes a head cover, the head cover is disposed on a side of the second substrate away from the radiation pattern.

In another aspect, the embodiment of the present application provides an electronic device, including the above dual-polarized antenna.

The above description is merely a summary of the technical solutions of the present application. In order to more clearly know the technological means of the present application to enable the implementation according to the contents of the description, and in order to make the above and other purposes, features and advantages of the present application more apparent and understandable, the particular embodiments of the present application are provided below.

BRIEF DESCRIPTION OF THE DRAWINGS

In order to more clearly illustrate the technical solutions of the embodiments of the present application or the related art, the drawings that are required to describe the embodiments or the related art will be briefly described below. Apparently, the drawings that are described below are merely embodiments of the present application, and a person skilled in the art may obtain other drawings according to these drawings without paying creative work.

DETAILED DESCRIPTION

Figure 1:
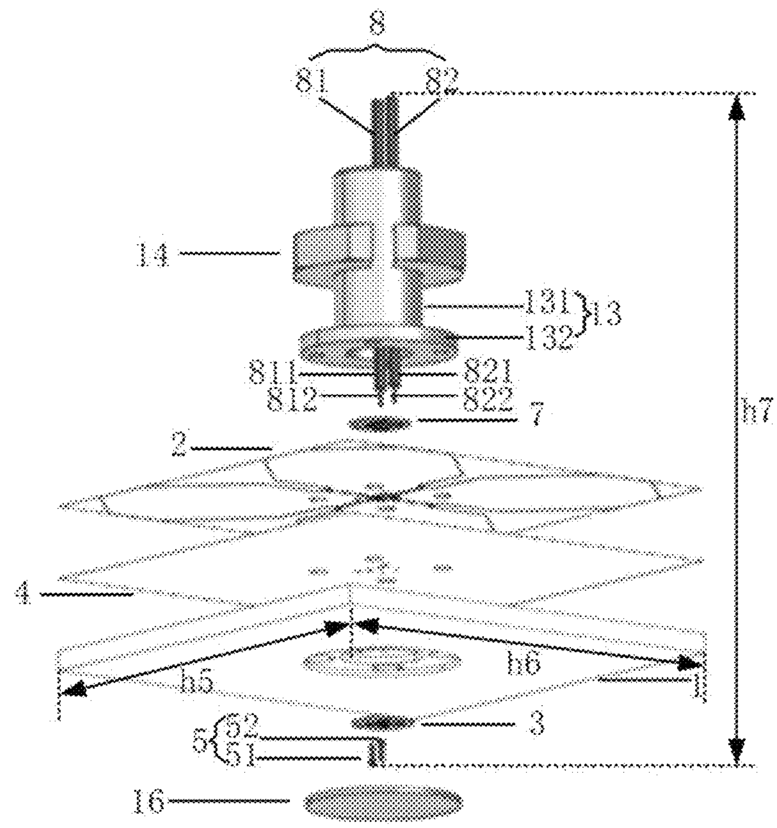
FIG. 1 is a schematic structural diagram of a dual-polarized antenna according to an embodiment of the present application.

In order to make the purpose, technical solutions and advantages of the embodiments of the present application clearer, the technical solutions in the embodiments of the present application will be described clearly and completely in combination with the drawings in the embodiments of the present application. Obviously, the described embodiments are part of the embodiments of the present application, not all of them. Based on the embodiments in the present application, all other embodiments obtained by ordinary technicians in the art without creative work fall within the scope of protection in the present application.

In the drawings, the thicknesses of the areas and layers may be exaggerated for clarity. The same reference numerals in the drawings represent the same or similar structures, so their detailed description will be omitted. In addition, the attached drawings are only schematic illustrations of the present application, and are not necessarily drawn to scale.

In the embodiment of the present application, unless otherwise stated, the orientation or position relationship indicated by the term “up” is based on the orientation or position relationship shown in the attached drawings, which is only for the convenience of describing the present application and simplifying the description, but not for indicating or implying that the structure or element referred to must have a specific orientation, be constructed and operated in a specific orientation, so it cannot be understood as a limitation of the present application.

Unless the context otherwise requires, the term “including/comprising” is interpreted as “including, but not limited to” in the entire specification and claims. In the description of the specification, the terms “one embodiment”, “some embodiments”, “exemplary embodiments”, “examples”, “specific examples” or “some examples” are intended to indicate that specific features, structures, materials or characteristics related to the embodiment or example are included in at least one embodiment or example of the present application. The schematic representation of the above terms does not necessarily refer to the same embodiment or example. In addition, the specific features, structures, materials or features described may be included in any one or more embodiments or examples in any appropriate manner.

In the embodiment of the present application, the words “first”, “second”, “third”, “fourth” and other words are used to distinguish the same or similar items with basically the same functions and actions, only for the purpose of clearly describing the technical solution of the embodiment of the present application, and cannot be understood as indicating or implying the relative importance or implying the quantity of the indicated technical features.

In the embodiment of the present application, the term “electrical connection” can refer to the direct electrical connection of two components, or the electrical connection between two components via one or more other components. “Electrical connection” can refer to electrical connection through wires or electrical connection through radio signals.

With the continuous development of the fifth generation mobile communication technology, transparent indoor ceiling antennas have been widely used in special situations requiring wireless coverage, such as office buildings, subways, shopping malls and airports, due to their transparent and beautiful appearance and excellent concealment.

However, at present, the mainstream transparent indoor ceiling antennas often only have one polarization mode, resulting in problems such as low profile, signal blind zone in the direction corresponding to its polarization direction, which is not conducive to the omni-directional coverage of the antenna on the horizontal plane.

Based on this, the embodiment of the present application provides a dual-polarized antenna, referring to FIG. 1, including: a radiation unit including a first substrate 1 and a radiation pattern 2 disposed on a side of the first substrate 1.

Referring to FIG. 1, the dual-polarized antenna also includes a feed unit including a second substrate 3, the second substrate 3 is disposed on a side of the first substrate 1 away from the radiation pattern 2.

The radiation unit is electrically connected to the feed unit.

There is no specific restriction on a material of the first substance. For example, the material of the first substance may be transparent rigid plastics, such as polycarbonate (PC), copolymers of cycloolefin (COP), polymethyl methacrylate (PMMA) or polyethylene terephthalate (PET). Alternatively, the material of the first substrate may be low-loss optical glass. Alternatively, the material of the first substrate may also be the material with a tangent angle loss the same or lower than that of the PC.

The thickness range of the above radiation pattern along the direction perpendicular to the first substrate may include 25-125 μm. For example, the thickness of the above radiation pattern along the direction perpendicular to the first substrate may be 25 μm, 50 μm, 75 μm, 100 μM or 125 μM and so on.

There is no specific restrictions on a material of the above radiation pattern. For example, the material of the above radiation pattern may be metal materials, such as copper, titanium, magnesium and other metals. Alternatively, the material of the above radiation pattern may also be glass fiber with metal coating. Alternatively, the material of the above radiation pattern may also be a resin coated with conductive carbon materials, including graphene, carbon fiber and carbon nanotubes. Alternatively, the material of the above radiation pattern may be any of PET, COP, polyimide (PI) films.

Figure 2:
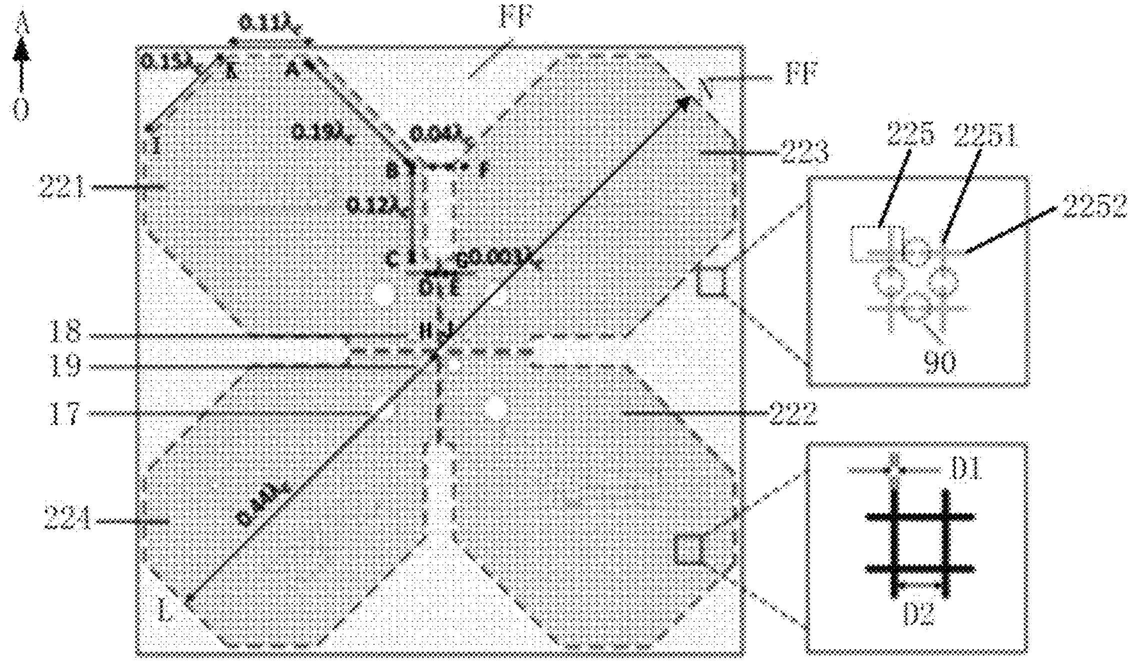
FIG. 2 is a vertical view of a radiation pattern according to an embodiment of the present application.

There is no specific restriction on the structure of the above radiation pattern. For example, the above radiation pattern may include a functional area and a non-functional area other than the functional area. Among them, the functional area may include a plurality of radiation sub-patterns. There is no specific restriction on the number of the radiation sub-patterns here. For example, the functional area may include a radiation sub-pattern: alternatively, the functional area may include more than two radiation sub-patterns. The non-functional area may include a plurality of discrete dimming patterns. There is no specific limit on the number of the dimming patterns. For example, the non-functional area may include a dimming pattern; alternatively, the non-functional area may include more than two dimming patterns. In FIG. 2, the radiation pattern includes the functional area and the non-functional area FF, wherein the functional area includes four radiation sub-patterns, namely, a first radiation sub-pattern 221, a second radiation sub-pattern 222, a third radiation sub-pattern 223 and a fourth radiation sub-pattern 224; the non-functional area FF includes a plurality of dimming patterns 225 arranged in array and disconnected from each other, the dining patterns 225 include a first conducting wire 2251 and a second conducting wire 2252 that are intersected with each other. And there is a breakpoint 90 between two adjacent dimming patterns 225.

There are no specific restrictions on the structures of the above first radiation sub-pattern, the second radiation sub-pattern, the third radiation sub-pattern and the fourth radiation sub-pattern. For example, the first radiation sub-pattern, the second radiation sub-pattern, the third radiation sub-pattern and the fourth radiation sub-pattern may all include a grid linear structure, which are shown in FIG. 2. The grid linear structure may include a metal grid structure.

There are no specific restrictions on line widths of metal grid lines of the first radiation sub-pattern, the second radiation sub-pattern, the third radiation sub-pattern and the fourth radiation sub-pattern. For example, ranges of the line widths of the grid lines of the first radiation sub-pattern, the second radiation sub-pattern, the third radiation sub-pattern and the fourth radiation sub-pattern may be 2 μm-30 μm. In some embodiments, the line width D1 shown in FIG. 2 may be 2 μm, 10 μm, 20 μm or 30 μm, and so on.

There are no specific restrictions on spacings between adjacent grid lines of the structures of the first radiation sub-pattern, the second radiation sub-pattern, the third radiation sub-pattern and the fourth radiation sub-pattern. For example, ranges of the spacings between adjacent grid lines of the structures of the first radiation sub-pattern, the second radiation sub-pattern, the third radiation sub-pattern and the fourth radiation sub-pattern may be 50 μm-200 μm. In some embodiments, the spacing D2 between adjacent grid lines shown in FIG. 2 may be 50 μm, 100 μm or 200 μm, and so on.

There are no specific restrictions on preparation processes of the first radiation sub-pattern, the second radiation sub-pattern, the third radiation sub-pattern and the fourth radiation sub-pattern. For example, the first radiation sub-pattern, the second radiation sub-pattern, the third radiation sub-pattern and the fourth radiation sub-pattern may be prepared by etching process or embossing process.

The line width of the grid line of the first radiation sub-pattern may be set to be less than the spacing between the adjacent grid lines of the first radiation sub-pattern, and a thickness of the first radiation sub-pattern in a direction perpendicular to a supporting base is less than the line width of the grid line of the first radiation sub-pattern. The line width of the grid line of the second radiation sub-pattern may be set to be less than the spacing between the adjacent grid lines of the second radiation sub-pattern, and a thickness of the second radiation sub-pattern in the direction perpendicular to the supporting base is less than the line width of the grid line of the second radiation sub-pattern. The line width of the grid line of the third radiation sub-pattern may be set to be less than the spacing between the adjacent grid lines of the third radiation sub-patter, and a thickness of the third radiation sub-pattern in the direction perpendicular to the supporting base is less than the line width of the grid line of the third radiation sub-pattern. The line width of the grid line of the fourth radiation sub-pattern may be set to be less than the spacing between the adjacent grid lines of the fourth radiation sub-pattern, and a thickness of the fourth radiation sub-pattern in the direction perpendicular to the supporting base is less than the line width of the grid line of the fourth radiation sub-pattern.

There is no specific limitation on the thickness of the above radiation pattern in a direction perpendicular to the first substrate. For example, the thickness range of the above radiation pattern in the direction perpendicular to the first substrate may all be 1 μm-10 μm, specifically, may be 1 μm, 3 μm, 5 μm, 7 μm or 10 μm and so on.

There is no specific limit on the light transmittance of the above radiation pattern. For example, the light transmittance of the above radiation pattern may be greater than 70%, for example, the light transmittance range is 70%-88%, specifically 70%, 78% or 88%, and so on.

It should be noted that the radiation unit may also include a supporting base disposed between the first substrate and the radiation pattern. The supporting base is used to support the first radiation sub-pattern of the grid linear structure, the second radiation sub-pattern of the grid linear structure, the third radiation sub-pattern of the grid linear structure and the fourth radiation sub-pattern of the grid linear structure, to avoid damage to the grid linear structures. In order not to affect the light transmittance of each radiation sub-pattern, a material of the supporting base may include polyethylene terephthalate (PET) material with high light transmittance; or, polyimide (PI) material.

On one hand, the radiation pattern with good light transmittance may be obtained by setting each radiation sub-pattern as a grid linear structure and combining with a transparent supporting base. On the other hand, by adjusting the line width, line spacing and thickness of the grid linear structure, the light transmission performance of the radiation pattern may be further improved without affecting the electrical performance of each radiation sub-pattern, so as to improve the beautification of the dual-polarized antenna and better integrate it into the indoor environment.

It also should be noted that, the specific line widths of the grid lines, the specific spacings between adjacent grid lines, and the specific thicknesses in the direction perpendicular to the first substrate of the first radiation sub-pattern, the second radiation sub-pattern, the third radiation sub-pattern and the fourth radiation sub-pattern may be the same or different.

The first radiation sub-pattern of the grid linear structure, the second radiation sub-pattern of the grid linear structure, the third radiation sub-pattern of the grid linear structure and the fourth radiation sub-pattern of the grid linear structure are all bonded to the first substrate through the supporting base. A bonding layer 4 as shown in FIG. 1 can be set between the supporting base and the first substrate. In practical applications, the bonding layer may be adhesive, for example, optically clear adhesive (OCA).

Figure 3:
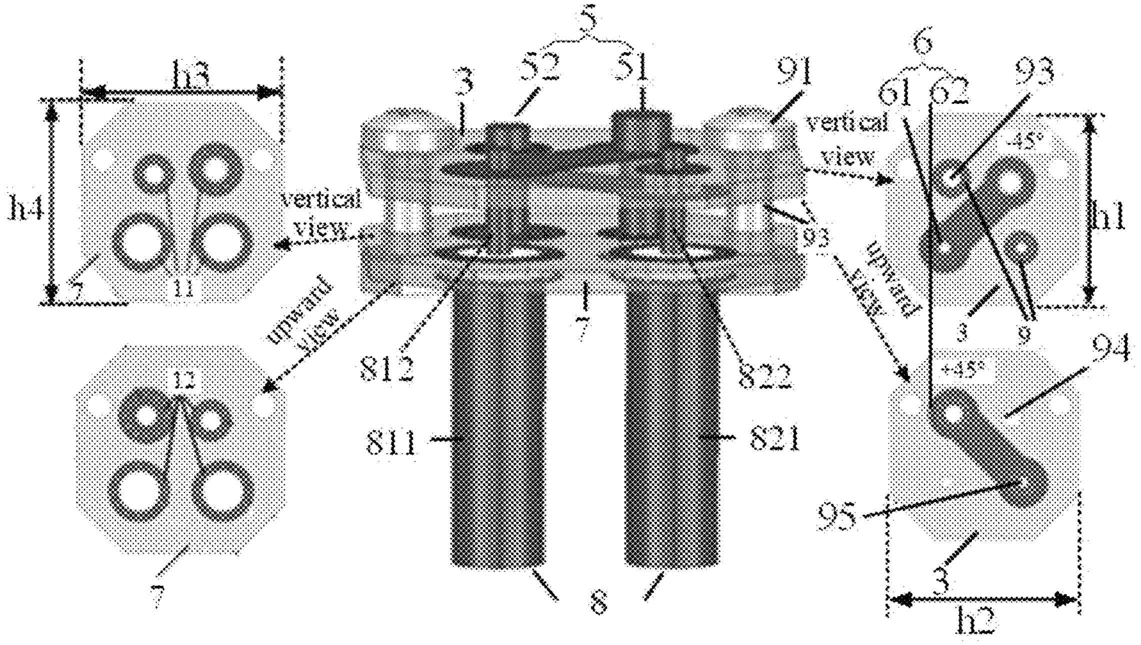
FIG. 3 is a schematic structural diagram of a feed unit according to an embodiment of the present application.

There is no specific restriction on the type of the above second substrate. For example, the above second substrate may include printed circuit boards (PCB), flexible printed circuit boards (FPC), etc. For example, the second substrate may include any graph such as a rectangle, a rectangle with an incisal corner, etc. FIG. 3 shows the second substrate 3 as a rectangle with four incisal corners. At this time, the specific size of the second substrate 3 may refer to FIG. 3. The length of h1 is 15 mm (0.09λc), the length of h2 is 15 mm (0.09λc). For example, when the second substrate is a PCB, a material of the PCB may be FR-4 resin, which is cheap and can effectively save costs.

There is no specific restriction on the way of the electrical connection between the above radiation unit and the feed unit. For example, the above radiation unit and the feed unit may be electrically connected directly. Alternatively, the above radiation unit and the feed unit may be electrically connected through other structures, such as the conductive column group 5 and the connecting electrode group 6 shown in FIG. 3.

The embodiment of the present application provides a dual-polarized antenna, which includes a radiation unit, including the first substrate and the radiation pattern disposed on the side of the first substrate; and a feed unit, including the second substrate, which is disposed on the side of the first substrate away from the radiation pattern; among them, the radiation unit is electrically connected to the feed unit. On one hand, the second substrate, the first substrate and the radiation pattern are arranged successively in a stacked structure to make the space between the radiation unit and the feed unit compact. On another hand, the above radiation pattern is pasted on the first substrate, which is the substrate with a certain mechanical strength, to further support the radiation pattern, thus improving the structural stability of the dual-polarized antenna, obtaining a dual-polarized antenna with increased mechanical hardness, and improving mass production. On yet another hand, the dual-polarized antenna of the new structure provided by the present application can realize omni-directional coverage of the signal on the horizontal plane.

In an embodiment of the present application, referring to FIG. 1 and FIG. 3, the feed unit further includes a third substrate 7, the third substrate 7 is disposed on a side of the radiation pattern 2 away from the first substrate 1 and is electrically connected to the second substrate 3, thus making the radiation pattern between the second substrate and the third substrate, which makes the space between the radiation unit and the feed unit compact.

There are no specific restrictions on the type, shape, size, material, etc. of the above third substrate. For example, the above third substrate may include printed circuit boards (PCB), flexible printed circuit boards (FPC), etc. For example, the third substrate may include any graph such as the rectangle, the rectangle with incisal corners, etc. FIG. 3 shows the third substrate 7 as the rectangle with four incisal corners. At this time, the specific size of the third substrate 7 may refer to FIG. 3. The length of h3 is 15 mm (0.09λc), and the length of h4 is 15 mm (0.09λc). For example, in the case that the third substrate is a PCB, the material of the PCB may be the FR-4 resin, which is cheap and may effectively save costs.

There are no specific restrictions on the ways of the electrical connection of the above third substrate and the second substrate. For example, the above third substrate and the second substrate may be electrically connected directly. Alternatively, the above third substrate and the second substrate may be electrically connected through other structures, such as the conductive column group 5 shown in FIG. 3.

It should be noted that, as shown in FIG. 3, the second substrate 3 and the third substrate 7 may be fixed by screws 91 and nuts 92.

In an embodiment of the present application, referring to FIG. 2, the radiation pattern includes a first radiation sub-pattern 221, a second radiation sub-pattern 222, a third radiation sub-pattern 223 and a fourth radiation sub-pattern 224; the first radiation sub-pattern 221, the second radiation sub-pattern 222, the third radiation sub-pattern 223 and the fourth radiation sub-pattern 224 are located in a same plane, and have a gap between each other. Thus, there is no direct conduction between the radiation sub-patterns, and the space of the dual-polarized antenna is more compact by setting the discrete sub-patterns in the same plane, so that the low profile can be achieved.

There are no specific restrictions on the shapes, positions and sizes of the first radiation sub-pattern, the second radiation sub-pattern, the third radiation sub-pattern and the fourth radiation sub-pattern. For example, the shapes of the first radiation sub-pattern, the second radiation sub-pattern, the third radiation sub-pattern and the fourth radiation sub-pattern may all be the same; alternatively, the shapes of the first radiation sub-pattern, the second radiation sub-pattern, the third radiation sub-pattern and the fourth radiation sub-pattern may all be different; alternatively, the first radiation sub-pattern, the second radiation sub-pattern, the third radiation sub-pattern and the fourth radiation sub-pattern may be partially the same. For example, referring to FIG. 2, the first radiation sub-pattern 221 and the second radiation sub-pattern 222 may be disposed in a mirror symmetry, and the third radiation sub-pattern 223 and the fourth radiation sub-patter 224 may be disposed in a mirror symmetry; alternatively, the first radiation sub-pattern and the second radiation sub-pattern may be disposed without mirror symmetry, and the third radiation sub-pattern and the fourth radiation sub-pattern may be disposed without mirror symmetry, which is subject to the actual application.

FIG. 2 shows that the first radiation sub-pattern 221, the second radiation sub-pattern 222, the third radiation sub-pattern 223 and the fourth radiation sub-pattern 224 have the same shape, and the first radiation sub-pattern 221 includes a rectangle with four incisal corners, a trapezoid and a triangle. As shown in FIG. 2, a side length AB of the rectangle in the first radiation sub-pattern 221 is 0.17λc-0.21λc (λc is a center frequency wavelength of an operating frequency band of the dual-polarized antenna operating at a certain frequency), preferably 0.19λc; a side length IK is 0.13λc-0.17λc, preferably 0.15λc; a side length BC is 0.10λc-0.15λc, preferably 0.12λc. Referring to FIG. 2, in the first radiation sub-pattern 221 of the present application, the ratio of the side length AB to the side length BC is about 1.56-1.60, preferably 1.58, which can make the dual-polarized antenna effectively realize broadband, make the dual-polarized antenna have a relative operating bandwidth (800 MHz-2700 MHz) which is greater than 108.6%, and thus can cover the 2G/3G/4G/5G frequency bands. Also, referring to FIG. 2, a length of the spacing LN between a side length of the rectangle opposite to the top angle of the triangle in the fourth radiation sub-pattern 224 and a side length of the rectangle opposite to the top angle of the triangle in the third radiation sub-pattern 223 is about 0.86λc-0.90λc, preferably 0.882c. That is, the spacing between a side length of the rectangle opposite to the top angle of the triangle in the first radiation sub-pattern and the top angle of the triangle in the first radiation sub-pattern is 0.43λc-0.45λc, preferably 0.44λc. At this time, the dual-polarized antenna has the relative operating bandwidth (800 MHz-2700 MHZ) which is greater than 108.6%, which can cover the 2G/3G/4G/5G frequency bands.

There are no specific restrictions on the gap widths among the above first radiation sub-pattern, the second radiation sub-pattern, the third radiation sub-pattern and the fourth radiation sub-pattern. For example, referring to FIG. 2, the first radiation sub-pattern 221 and the third radiation sub-pattern 223 are symmetrical about a first direction (OA direction shown in FIG. 2), the spacing between the side length BC of the rectangle in the first radiation sub-pattern 221 and the side length FG of the rectangle in the third radiation sub-pattern 223 is 0.02λc-0.06λc, preferably 0.04λc; the spacing between the side length DH of the triangle in the first radiation sub-pattern 221 and the side length EJ of the triangle in the third radiation sub-pattern 223 is 0.001λc-0.005λc, preferably 0.0032c, which can fully ensure that there is no direct conduction between the radiation sub-patterns. In the radiation sub-patterns of the present application, the ratio of the side length BC to the spacing between the side length BC and the side length FG is about 2-5, preferably 3, so that the dual-polarized antenna can effectively achieve broadband, and the dual-polarized antenna has the relative operating bandwidth (800 MHz-2700 MHz) which is greater than 108.6%, thus covering the 2G/3G/4G/5G frequency bands.

In some embodiments of the present application, referring to FIG. 2, a direction in which a geometric center of the first radiation sub-pattern 221 points to a geometric center of the second radiation sub-pattern 222 intersects with a direction in which a geometric center of the third radiation sub-pattern 223 points to a geometric center of the fourth radiation sub-pattern 224. Thus, by using a crossed double dipole as the radiation sub-patterns, the working bandwidth from 800 MHz to 2700 MHz can be realized in the compact space of the dual-polarized antenna of which the size can only be (0.70λc-0.75λc)/(0.70λc-0.75λc), preferably 0.73λc×0.73λc.

There is no specific restriction on an included angle between the direction in which the geometric center of the first radiation sub-pattern points to the geometric center of the second radiation sub-pattern and the direction in which the geometric center of the third radiation sub-pattern points to the geometric center of the fourth radiation sub-pattern. For example, the above included angle may be 90°, that is, to achieve ±45° dual polarization of the radiation sub-patterns at the horizontal plane. Thus, the height of the dual-polarized antenna may be effectively reduced, and the nearly omnidirectional signal coverage of dual-polarized antenna at the horizontal plane may also be achieved by using the mode of ±45° dual-polarized at the horizontal plane.

In some embodiments of the present application, the first radiation sub-pattern is electrically connected to the second radiation sub-pattern through the feed unit; and the third radiation sub-pattern is electrically connected to the fourth radiation sub-pattern through the feed unit. Thus, by using the crossed double dipole as the radiation sub-patterns, the working bandwidth from 800 MHz to 2700 MHz can be realized in the compact space of the dual-polarized antenna of which the size can only be (0.70λc-0.75λc)×(0.70λc–0.75λc), preferably 0.73λc×0.73λc.

In some embodiments of the present application, referring to FIG. 1, the feed unit further includes a feeder group 8, the feeder group 8 is electrically connected to the third substrate 7 and the second substrate 3; and an extension direction (the OA direction shown in FIG. 1) of a feeder of the feeder group 8 intersects with a plane where the radiation pattern 2 is located. Thus, the electrical connection between the feeder in the feeder group and the radiation pattern is effectively realized, so that the feeder transmits signals to the radiation sub-patterns in the radiation pattern, thus realizing the signal coupling transmission of the dual-polarized antenna.

There is no specific restriction on the quantity of the feeders in the above feeder group. The specific quantity may be determined according to the type of the antenna and the specific situation. For example, when the antenna is the dual-polarized antenna, the quantity of the feeders is two as shown in FIG. 1, that is, a first feeder 81 and a second feeder 82. The structure of the feeder here is not specifically limited. For example, the feeder may include an outer conductor and an inner core.

There is no specific restriction on the way of the electrical connection between the feeder group and the third substrate and the second substrate. For example, as shown in FIG. 3, both the third substrate 7 and the second substrate 3 have through holes, such as a feeder through hole 94 shown in FIG. 3. In addition, the feed unit also includes a pad disposed on the third substrate and a pad disposed on the second substrate. The feeder group passes through the through holes on the third substrate and the second substrate in turn, and is electrically connected to the third substrate through the pad disposed on the third substrate, and to the second substrate through the pad disposed on the second substrate. The pads here can be provided with through holes, for example, a through hole 95 of the inner core of the feeder shown in FIG. 3.

There is no specific restriction on the angle of intersection between the extension direction of the feeder and the plane where the radiation pattern is located, as long as it can ensure the electrical connection between the feeder and the radiation sub-patterns in the radiation pattern.

In some embodiments of the present application, referring to FIG. 1 and FIG. 3, the feeder group 8 includes the first feeder SI and the second feeder 82.

Referring to FIG. 1 and FIG. 3, the first feeder 81 passes through the third substrate 7 and the first radiation sub-pattern 221, and the first feeder 81 is electrically connected to the third substrate 7, the first radiation sub-pattern 221 and the second substrate 3.

Referring to FIG. 1 and FIG. 3, the second feeder 82 passes through the third substrate 7 and the third radiation sub-pattern 223, and the second feeder 82 is electrically connected to the third substrate 7, the third radiation sub-pattern 223 and the second substrate 3.

The types, sizes and structures of the first feeder and the second feeder may be identical; alternatively, they may be completely different, which are depended on the actual application. In some embodiments of the present application, as shown in FIG. 3, the first feeder 81 and the second feeder 82 are radio frequency cables, and the first feeder 81 and the second feeder 82 both include the outer conductor and the inner core, and the inner core is covered by the outer conductor.

There are no specific restrictions on the way and sequence of the first feeder passing through the third substrate and the first radiation sub-pattern. For example, FIG. 3 shows that there are through holes on the third substrate 7 and the first radiation sub-pattern 221, and the first feeder 81 passes through the third substrate 7 and the first radiation sub-pattern 221 in turn via the through holes. There are no specific restrictions on the sizes and positions of the through holes, as long as the first feeder can pass through the third substrate and the first radiation sub-pattern.

There are no specific restrictions on the way in which the first feeder is electrically connected to the third substrate, the first radiation sub-pattern and the second substrate, respectively. For example, the first feeder may be directly connected to the third substrate, the first radiation sub-pattern and the second substrate, respectively; alternatively, the above first feeder may be electrically connected to the third substrate, the first radiation sub-pattern and the second substrate through other structures. For example, as shown in FIG. 3, the feed unit also includes the pad disposed on the third substrate 7 and the pad disposed on the second substrate 3. The first feeder 81 is electrically connected to the third substrate and the second substrate, respectively, through the first conductive column 51 in the conductive column group 5, the first connecting electrode 61 in the connecting electrode group 6, the pad on the third substrate and the pad on the second substrate; and the first feeder 81 is directly connected to the first radiation sub-pattern 221 by welding.

In some embodiments of the present application, as shown in FIG. 3, the outer conductor 811 of the first feeder 81 is electrically connected to the third substrate 7 through the pad, and the inner core 812 of the first feeder 81 is electrically connected to the second substrate 3 through the pad.

There are no specific restrictions on the way and sequence of the second feeder passing through the third substrate and the third radiation sub-pattern. For example, FIG. 3 shows that there are through holes on the third substrate 7 and the third radiation sub-pattern 223, and the second feeder 82 passes through the third substrate 7 and the third radiation sub-pattern 223 in turn via the through holes. There are no specific restrictions on the sizes and positions of the through-holes, as long as the second feeder can pass through the third substrate and the third radiation sub-pattern.

There are no specific restrictions on the way in which the second feeder is electrically connected to the third substrate, the third radiation sub-pattern and the second substrate, respectively. For example, the second feeder may be directly electrically connected to the third substrate, the third radiation sub-pattern and the second substrate, respectively; alternatively, the above second feeder may be electrically connected to the third substrate, the third radiation sub-pattern and the second substrate through other structures. For example, as shown in FIG. 3, the feed unit also includes the pad disposed on the third substrate 7 and the pad disposed on the second substrate 3. The second feeder 82 is electrically connected to the third substrate and the second substrate through the second conductive column 52 in the conductive column group 5, the second connecting electrode 62 in the connecting electrode group 6, the pad on the third substrate and the pad on the second substrate, respectively; and the second feeder 82 is directly connected to the third radiation sub-pattern 223 by welding.

In some embodiments of the present application, referring to FIG. 3, the outer conductor 821 of the second feeder 82 is electrically connected to the third substrate 7 through the pad, and the inner core 822 of the second feeder 82 is electrically connected to the second substrate 3 through the pad.

In some embodiments of the present application, referring to FIG. 3, the feed unit further includes a conductive column group 5 and a connecting electrode group 6.

Referring to FIG. 3, the conductive column group 5 passes through the second substrate 3 and the radiation pattern 2, and the conductive column group 5 is electrically connected to the second substrate 3, the radiation pattern 2 and the third substrate 7.

Referring to FIG. 3, a plane where the connecting electrode group 6 is located is parallel to a plane where the second substrate 3 is located, and the connecting electrode group 6 is electrically connected to the conductive column group 5, the second substrate 3 and the feeder group 8.

There are no specific restrictions on the quantity, materials, structures, etc. of the conductive columns in the above conductive column group. For example, the quantity of the conductive columns in the above conductive column group may be one, two or more. FIG. 1 and FIG. 3 are illustrated with the example that the conductive column group 5 includes two conductive columns, namely the first conductive column 51 and the second conductive column 52. For example, the materials of the conductive columns in the conductive column group may include metal materials, such as copper. As shown in FIG. 3, the first conductive column 51 and the second conductive column 52 both include the outer conductor and the inner core, and the inner core is covered by the outer conductor.

There are no specific restrictions on the way and sequence of the above conductive column group passing through the second substrate and the radiation pattern. For example, FIG. 3 shows that there are through holes on the second substrate 3 and the radiation pattern 2, and the conductive column group passes through the second substrate 3 and the radiation pattern 2 in turn via the through holes. There are no specific restrictions on the sizes and positions of the through holes, as long as the conductive column group can pass through the second substrate and the radiation pattern.

There are no specific restrictions on the way in which the above conductive column group is electrically connected with the second substrate, the radiation pattern and the third substrate, respectively. For example, the above conductive column group can be electrically connected to the second substrate, the radiation pattern and the third substrate, respectively; alternatively, the above conductive column group can be electrically connected to the second substrate, the radiation pattern and the third substrate through other structures. For example, as shown in FIG. 3, the feed unit also includes the pad disposed on the third substrate 7 and the pad disposed on the second substrate 3. The conductive column group 5 is electrically connected to the third substrate and the second substrate through the pad on the third substrate 7 and the pad on the second substrate 3; and the conductive column group 5 is directly connected to the radiation pattern 2 by welding. Specifically, as shown in FIG. 3, the pad on the second substrate 3 has a conductive column through hole 93.

There are no specific restrictions on the way in which the above connecting electrode group is electrically connected to the conductive column group, the second substrate and the feeder group, respectively. For example, the above connecting electrode group can be electrically connected to the conductive column group, the second substrate and the feeder group, respectively; alternatively, the above connecting electrode group can be electrically connected to the conductive column group, the second substrate and the feeder group through other structures. For example, as shown in FIG. 3, the feed unit also includes a pad disposed on the second substrate 3. In FIG. 3, the connecting electrode group 6 is electrically connected to the second substrate 3 through the pad.

The dual-polarized antenna provided by the embodiment of the present application can realize the electrical connection of the feeder group, the second substrate and the radiation pattern through the conductive column group and the connecting electrode group, and can further realize the electrical connection of ±45° dual polarization.

In some embodiments of the present application, referring to FIG. 3, the conductive column group 5 includes a first conductive column 51 and a second conductive column 52.

Referring to FIG. 3, the connecting electrode group 6 includes a first connecting electrode 61 disposed on a side of the second substrate 3 close to the radiation pattern 2, and a second connecting electrode 62 disposed on a side of the second substrate 3 away from the radiation pattern.

Referring to FIG. 3, the first conductive column 51 passes through the second substrate 3 and the second radiation sub-pattern 222, the first conductive column 51 is electrically connected to the second substrate 3, the second radiation sub-pattern 222 and the third substrate 7; one end of the first connecting electrode 61 is sleeved on the first conductive column 51 and the other end of the first connecting electrode 61 is sleeved on the first feeder 81, the first connecting electrode 61 is electrically connected to the first conductive column 51, the second substrate 3 and the first feeder 81.

Referring to FIG. 3, the second conductive column 52 passes through the second substrate 3 and the fourth radiation sub-pattern 224, the second conductive column 52 is electrically connected to the second substrate 3, the fourth radiation sub-pattern 224 and the third substrate 7; one end of the second connecting electrode 62 is sleeved on the second conductive column 52 and the other end of the second connecting electrode 62 is sleeved on the second feeder 82, the second connecting electrode 62 is electrically connected to the second conductive column 52, the second substrate 3 and the second feeder 82.

The types and sizes of the first conductive column and the second conductive column may be identical; or, they may be completely different, which is depended on the actual application. For example, the conductive column group 5 in FIG. 1 and FIG. 3 includes the first conductive column 51 and the second conductive column 52, and these two conductive columns are two copper columns.

The types and sizes of the first connecting electrode and the second connecting electrode may be identical: or, they may be completely different, which is depended on the actual application. For example, FIG. 2 shows shapes of orthographic projections of the first connecting electrode 61 and the second connecting electrode 62 along the direction perpendicular to the second substrate 3 are the same, specifically including a combination of two semicircles with through holes and a rectangle connecting the two semicircles. In addition, in FIG. 2, the orthographic projections of the first connecting electrode 61 and the second connecting electrode 62 along the direction perpendicular to the second substrate 3 are intersected at ±45°, so that ±45° polarization between the first radiation sub-pattern 221 and the third radiation sub-pattern 223, and between the second radiation sub-pattern 222 and the fourth radiation sub-pattern 224 can be realized through the first connecting electrode 61 and the second connecting electrode 62 that are intersected at #459.

There are no specific restrictions on the way and sequence of the first conductive column passing through the second substrate and the second radiation sub-pattern. For example, FIG. 3 shows that both the second substrate and the second radiation sub-pattern have the through holes, and the first conductive column passes through the second substrate and the second radiation sub-pattern in turn via the through holes. There are no specific restrictions on the sizes and positions of the through holes, as long as the first conductive column can pass through the second substrate and the second radiation sub-pattern.

There is no specific restriction on the way in which the first conductive column is electrically connected to the second substrate, the second radiation sub-pattern and the third substrate, respectively. For example, the first conductive column may be electrically connected to the second substrate, the second radiation sub-pattern and the third substrate, respectively; alternatively, the above first conductive column may be electrically connected to the second substrate, the second radiation sub-pattern and the third substrate through other structures. For example, as shown in FIG. 3, the feed unit also includes the pad disposed on the third substrate and the pad disposed on the second substrate. The first conductive column 41 may be electrically connected to the third substrate and the second substrate through the pad disposed on the third substrate and the pad disposed on the second substrate, respectively; and the first conductive column 41 is directly connected to the second radiation sub-pattern 222 by welding.

There is no specific restriction on the way in which one end of the first connecting electrode 61 is sleeved on the first conductive column and the other end of the first connecting electrode 61 is sleeved on the first feeder. For example, FIG. 3 shows that the first connecting electrode 61 has two through holes, and the first connecting electrode 61 is sleeved on the first conductive column 41 and the first feeder 81 through these two through holes.

There are no specific restrictions on the way and sequence of the above second conductive column passing through the second substrate and the fourth radiation sub-pattern. For example, FIG. 2 and FIG. 3 show that the second substrate 3 and the fourth radiation sub-pattern 224 have the through holes, and the second conductive column 52 passes through the second substrate 3 and the fourth radiation sub-pattern 224 in turn via the through holes. There are no specific restrictions on the size and position of the through holes, as long as the second conductive column can pass through the second substrate and the fourth radiation sub-pattern.

There are no specific restrictions on the way in which the above second conductive column is electrically connected to the second substrate, the fourth radiation sub-pattern and the third substrate, respectively. For example, the above second conductive column may be electrically connected to the second substrate, the fourth radiation sub-pattern and the third substrate, respectively; alternatively, the above second conductive column may be electrically connected to the second substrate, the fourth radiation sub-pattern and the third substrate through other structures. For example, as shown in FIG. 3, the feed unit also includes the pad disposed on the third substrate and the pad disposed on the second substrate. The second conductive column 42 may be electrically connected to the third substrate and the second substrate through the pad disposed on the third substrate and the pad disposed on the second substrate, respectively; and the second conductive column 42 is electrically connected to the fourth radiation sub-pattern 224 by welding directly.

In the dual-polarized antenna provided by the embodiment of the present application, the first radiation sub-pattern may be electrically connected to the second radiation sub-pattern through the first feeder, the first connecting electrode, and the first conductive column, respectively. The third radiation sub-pattern may be electrically connected to the fourth radiation sub-pattern through the second feeder, the second connecting electrode, and the second conductive column, respectively. So as to realize the signal coupling between the first radiation sub-pattern and the second radiation sub-pattern, as well as the signal coupling between the third radiation sub-pattern and the fourth radiation sub-pattern, and realize the signal transmission of the dual-polarized antenna, and further realize the electrical connection of ±45° dual-polarized antenna.

In some embodiments of the present application, referring to FIG. 3, the feed unit further includes a first pad group 9 disposed on a side of the second substrate 3 away from the radiation pattern 2 and a second pad group (not shown in the drawings) disposed on a side of the second substrate 3 close to the radiation pattern 2, and shapes of orthographic projections of the first pad group 9 and the second pad group on the second substrate 3 are annular.

Referring to FIG. 3, the first pad group 9 is sleeved on the first conductive column 51 and the first feeder 81, and the first conductive column 51 and the first feeder 81 are electrically connected to the second substrate 3 through the first pad group 9 and the first connecting electrode 61.

Referring to FIG. 3, the second pad group is sleeved on the second conductive column 52 and the second feeder 82, and the second conductive column 52 and the second feeder 82 are electrically connected to the second substrate 3 through the second pad group and the second connecting electrode 62.

There are no specific restrictions on diameters, areas and types of the rings of the first pad group and the second pad group. For example, FIG. 3 shows that the diameters, the areas and the types of the rings of the first pad group 9 and the second pad group are all the same. As shown in FIG. 3, the ring has a through hole in the middle, and a circle around the ring is provided with a plurality of discrete via holes.

There are no specific restrictions on numbers, structures and sizes of pads in the above first pad group and the second pad group. For example, FIG. 3 shows that the first pad group 9 and second pad group include two pads with the same structure and size. As shown in FIG. 3, the circle around the ring is provided with the plurality of discrete via holes, and at the same time, two semicircles of the connecting electrodes in the connecting electrode group are also arranged with a circle of the plurality of discrete via holes. Through the electrical connection between the via holes on the pads and the via holes on the connecting electrodes, the electrical connections between the pads and the conductive columns, and between the pads and the feeders are realized. Specifically, copper nails can be placed in the via boles on the pads and the via holes on the connecting electrodes to realize the electrical connections between the pads and the conductive columns, and between the pads and the feeders, and so on.

In some embodiments of the present application, referring to FIG. 3, the feed unit further includes a third pad group 11 disposed on a side of the third substrate 7 away from the radiation pattern 2 and a fourth pad group 12 disposed on a side of the third substrate 7 close to the radiation pattern 2, and shapes of orthographic projections of the third pad group 11 and the fourth pad group 12 on the second substrate 3 are annular.

Referring to FIG. 3, the third pad group 11 and the fourth pad group 12 are sleeved on the first conductive column 51, the second conductive column 52, the first feeder SI and the second feeder 82; and the first conductive column 51, the second conductive column 52, the first feeder 81 and the second feeder 82 are electrically connected to the third substrate 7 through the third pad group 11 and the fourth pad group 12.

There are no specific restrictions on diameters, areas and types of the rings of the above third pad group and the fourth pad group. For example, FIG. 3 shows that the diameters, the areas and the types of the rings of the third pad group 11 and the fourth pad group 12 are all the same. As shown in FIG. 3, the ring has a through hole in the middle, and a circle around the ring is provided with a plurality of discrete via holes.

There are no specific restrictions on numbers, structures and sizes of pads in the above third pad group and the fourth pad group. For example, FIG. 3 shows that the third pad group 11 and fourth pad group 12 both include four pads with the same structure and size. Specifically, as shown in FIG. 3, a circle around the ring is provided with the plurality of discrete via holes, and at the same time, two semicircles of the connecting electrodes in the connecting electrode group are also arranged with a circle of the plurality of discrete via holes. Through the electrical connection between the via holes on the pads and the via holes on the connecting electrodes, the electrical connections between the pads and the conductive columns, and between the pads and the feeders are realized. Specifically, copper nails can be placed in the via holes on the pads and the via holes on the connecting electrodes to realize the electrical connections between the pads and the conductive columns, and between the pads and the feeders.

Specifically, as shown in FIG. 3, the outer conductor 811 of the first feeder 81, the outer conductor 821 of the second feeder 82, the outer conductor of the first conductive column 51 and the inner core of the second conductive column 52 are electrically connected to the third substrate 7 through the third pad group 11 and the fourth pad group 12. At the same time, the inner core 812 of the first feeder 81, the inner core 822 of the second feeder 82, the inner core of the first conductive column 51 and the outer conductor of the second conductive column 52 are electrically connected to the second substrate 3 through the first pad group 9 and the second pad group 10.

It should be noted that, firstly, the first radiation sub-pattern, the second radiation sub-pattern, the third radiation sub-pattern and the fourth radiation sub-pattern are all provided with through holes for fixing the second substrate and/or the third substrate. Referring to FIG. 2, the through holes are screw holes 17. Referring to FIG. 2, the first radiation sub-pattern, the second radiation sub-pattern, the third radiation sub-pattern and the fourth radiation sub-pattern are also provided with a copper column hole 18 for conducting the conductive column group 8 and feeder holes 19 for inserting the feeders.

Secondly, considering that crimping areas of the first radiation sub-pattern, the second radiation sub-pattern, the third radiation sub-pattern and the fourth radiation sub-pattern with the pads on the second substrate and/or the third substrate are large enough to achieve stable conduction, the circular hole positions on the radiation sub-patterns, the second substrate and the third substrate are designed with edge banding.

Thirdly, both the second substrate and the third substrate form the through holes by the metallization through-hole process. Thus, the second substrate realizes a cross electrical connection path between a upper surface and a lower surface of the second substrate through the through hole. One end of the cross electrical connection path is welded to the feeder, and the other end is welded to the other end of the radiation sub-pattern by using a conductive column. The third substrate is used to provide the outer conductor of the feeder and the pad of the conductive column, so as to improve the welding strength.

In some embodiments of the present application, referring to FIG. 2, the radiation pattern includes a functional area and a non-functional area FF other than the functional area, and a gap is disposed between the functional area and the non-functional area FF; and the first radiation sub-pattern 221, the second radiation sub-pattern 222, the third radiation sub-pattern 223 and the fourth radiation sub-pattern 224 are disposed in the functional area. Thus, it can facilitate the production of the radiation patterns, and protect the first radiation sub-pattern, the second radiation sub-pattern, the third radiation sub-pattern and the fourth radiation sub-pattern.

The above functional area refers to the area with the radiation sub-patterns, which realize signal transmission of the dual-polarized antenna through signal coupling of the radiation sub-patterns. The above non-functional area refers to the area without the radiation sub-patterns, which does not realize the signal transmission of the dual-polarized antenna.

In some embodiments of the present application, the first radiation sub-pattern, the second radiation sub-pattern, the third radiation sub-pattern and the fourth radiation sub-pattern are grid linear structures. Thus, it can effectively improve the light transmittance of the radiation layer, and make the antenna unit have a transparent effect with excellent light transmittance. The range of the light transmittance can reach 70%-88%, which has better concealment and higher aesthetics.

There is no specific restriction on the material of the above grid linear structure. For example, the above grid linear structure can include metal grid linear structure.

There are no specific restrictions on the line widths of metal grid lines of the first radiation sub-pattern, the second radiation sub-pattern, the third radiation sub-pattern and the fourth radiation sub-pattern. For example, ranges of the line widths of the grid lines of the first radiation sub-pattern, the second radiation sub-pattern, the third radiation sub-pattern and the fourth radiation sub-pattern may all be 2 μm-30 μm, specifically 2 μm, 10 μm, 20 μm or 30 μm and so on.

There are no specific restrictions on the spacings between adjacent grid lines of the structures of the first radiation sub-pattern, the second radiation sub-pattern, the third radiation sub-pattern and the fourth radiation sub-pattern. For example, ranges of the spacings between adjacent grid lines of the structures of the first radiation sub-pattern, the second radiation sub-pattern, the third radiation sub-pattern and the fourth radiation sub-pattern may all be 50 μm-200 μm, specifically 50 μm, 100 μm or 200 μm and so on.

There are no specific restrictions on the preparation processes of the first radiation sub-pattern, the second radiation sub-pattern, the third radiation sub-pattern and the fourth radiation sub-pattern. For example, the above first radiation sub-pattern, the second radiation sub-pattern, the third radiation sub-pattern and the fourth radiation sub-pattern may all be prepared by etching process or embossing process.

The line width of the grid line of the first radiation sub-pattern may be set to be less than the spacing between the adjacent grid lines of the first radiation sub-pattern, and a thickness of the first radiation sub-pattern in a direction perpendicular to a supporting base is less than the line width of the grid line of the first radiation sub-pattern. The line width of the grid line of the second radiation sub-pattern may be set to be less than the spacing between the adjacent grid lines of the second radiation sub-pattern, and a thickness of the second radiation sub-pattern in the direction perpendicular to the supporting base is less than the line width of the grid line of the second radiation sub-pattern. The line width of the grid line of the third radiation sub-pattern may be set to be less than the spacing between the adjacent grid lines of the third radiation sub-patter, and a thickness of the third radiation sub-pattern in the direction perpendicular to the supporting base is less than the line width of the grid line of the third radiation sub-pattern. The line width of the grid line of the fourth radiation sub-pattern may be set to be less than the spacing between the adjacent grid lines of the fourth radiation sub-pattern, and a thickness of the fourth radiation sub-pattern in the direction perpendicular to the supporting base is less than the line width of the grid line of the fourth radiation sub-pattern.

In some embodiments of the present application, referring to FIG. 2, the first radiation sub-pattern 221 and the second radiation sub-pattern 222 are disposed in a mirror symmetry; and the third radiation sub-pattern 223 and the fourth radiation sub-pattern 224 are disposed in a mirror symmetry.

Referring to FIG. 2, shapes of the first radiation sub-pattern 221, the second radiation sub-pattern 222, the third radiation sub-pattern 223 and the fourth radiation sub-pattern 224 are the same. Thus facilitating the preparation of the radiation sub-patterns, and making the dual-polarized antenna of the present application has the relative operating bandwidth (800 MHz-2700 MHz) which is greater than 108.6%, and covering the 2G/3G/4G/5G frequency bands. Meanwhile, the dual-polarized antenna in the present application has low profile characteristics and ±45° dual-polarized mode, and has excellent concealment characteristics.

There are no specific restrictions on the shapes of the first radiation sub-pattern, the second radiation sub-pattern, the third radiation sub-pattern and the fourth radiation sub-pattern. For example, the shapes of the above first radiation sub-pattern, the second radiation sub-pattern, the third radiation sub-pattern and the fourth radiation sub-pattern may all be regular shapes, such as a rectangle, a rectangular ring, a circle, a circular ring, a hexagon, a hexagon ring, a hexagon star, a hexagon star ring, a diamond, a diamond ring, a cross, a cross ring, a triangle, a triangle ring, etc.; alternatively, the shapes of the first radiation sub-pattern, the second radiation sub-pattern, the third radiation sub-pattern and the fourth radiation sub-pattern may all be irregular shapes, such as a combination of multiple polygons.

In some embodiments of the present application, referring to FIG. 2, a shape of an orthographic projection of the first radiation sub-pattern 221 on the first substrate 1 includes a combination of a plurality of polygons. Thus, the symmetry of the first radiation sub-pattern and the second radiation sub-pattern, as well as the symmetry of the third radiation sub-pattern and the fourth radiation sub-pattern may be effectively realized, and the ±45° dual-polarization of the first radiation sub-pattern, the second radiation sub-pattern, the third radiation sub-pattern and the fourth radiation sub-pattern in the same plane may be realized, so that the dual-polarized antenna can achieve low profile and other effects.

There is no specific restriction on the number of polygons that form the orthographic projection of the first radiation sub-pattern on the first substrate. For example, the number of polygons can include two or more.

There are no specific restrictions on the types of the above polygons. For example, the above polygons can include any of the rectangle, the rectangle ring, the circle, the circle ring, the hexagon, the hexagon ring, the hexagon star, the hexagon star ring, the diamond, the diamond ring, the cross, the cross ring, the triangle, the triangle ring, and so on.

In some embodiments of the present application, referring to FIG. 2, the shape of the orthographic projection of the first radiation sub-pattern 221 on the first substrate 1 includes a combination of rectangles with four incisal corners, a trapezoid and a triangle; and the rectangles with four incisal corners are connected to the triangle through the trapezoid. Thus, it is convenient to make the first radiation sub-pattern, the second radiation sub-pattern, the third radiation sub-pattern and the fourth radiation sub-pattern, and realize ±45° dual-polarization of the first radiation sub-pattern, the second radiation sub-pattern, the third radiation sub-pattern and the fourth radiation sub-pattern in the same plane, thus making the dual-polarized antenna achieve the effect of low profile.

There is no specific limit on the areas of the rectangles with four incisal corners, the trapezoid and the triangle, which is subject to the actual needs.

In some embodiments of the present application, referring to FIG. 2, the non-functional area FF includes a plurality of dimming patterns 225 arranged in array and disconnected from each other, and the dimming pattern 225 includes a first conducting wire 2251 and a second conducting wire 2252 that are intersected with each other. Thus, the periphery of the functional area is filled with Dummy mesh with four-sided breakpoints in the non-functional area. In this way, since the non-functional area uses the Dummy grid with four-sided breakpoints, the non-functional area hardly affects the normal operation of the functional area. At the same time, the Dummy grid weakens the display effect of the functional area of the dual-polarized antenna and further plays the role of optical shadow elimination.

There is no specific limit on the number of the above dimming patterns. For example, the number of the above dimming patterns can include more than two.

There is no specific limit on the angle of intersection of the first conducting wire and the second conducting wire. For example. FIG. 2 shows the vertical intersection of the first conducting wire 2251 and the second conducting wire 2252.

There are no specific restrictions on the lengths and the widths of the first conducting wire and the second conducting wire, which are subject to the actual application.

Figure 4:
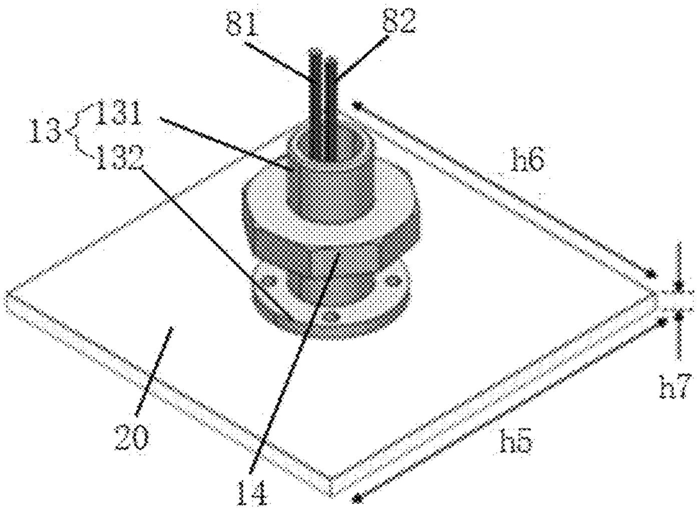
FIG. 4 is a schematic structural diagram of installation of a dual-polarized antenna and a ceiling according to an embodiment of the present application.
Figure 5:
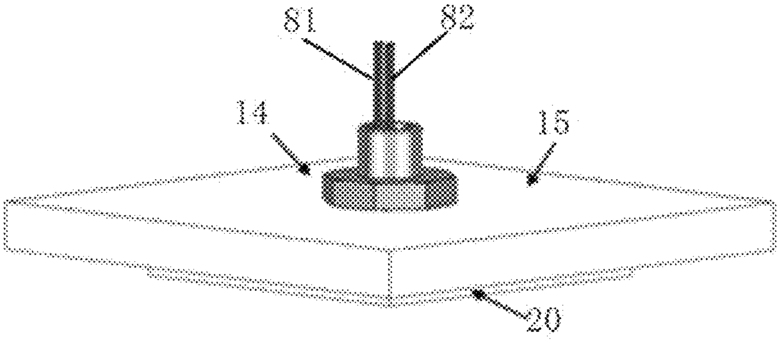
FIG. 5 is another schematic structural diagram of installation of a dual-polarized antenna and a ceiling according to an embodiment of the present application.

In some embodiments of the present application, referring to FIG. 1, FIG. 4 and FIG. 5, the dual-polarized antenna further includes a fixed unit disposed on a side of the third substrate 7 away from the radiation pattern 2, the fixed unit includes a first fixed structure 13 and a second fixed structure 14, and the first fixed structure 13 is sleeved on the feeder group 8.

Referring to FIG. 1, FIG. 4 and FIG. 5, the first fixed structure 13 includes a first fixed part 131 and a second fixed part 132 that are connected with each other, an extension direction of the first fixed part 131 is perpendicular to a plane where the second fixed part 132 is located; and the second fixed structure 14 is sleeved on a side of the first fixed part 131 away from the feeder group 8 and disposed on a side of the second fixed part 132 away from the third substrate 7. Thus, the feeder group can be protected by the fixed structure on the one hand, and the antenna 20 in FIG. 4 and FIG. 5 can be perfectly combined with the ceiling 15 on the other hand.

The above first fixed structure is not specifically limited. For example, FIG. 1, FIG. 4 and FIG. 5 are illustrated with the first fixed structure including studs as an example. There is no specific restriction on materials of the studs. For example, FIG. 1, FIG. 4 and FIG. 5 show the materials of the studs as plastic.

The above first fixed structure is not specifically limited. For example, FIG. 1, FIG. 4 and FIG. 5 are illustrated with the second fixed structure 14 including nuts as an example. There is no specific restriction on the types of the nuts. For example, FIG. 1, FIG. 4 and FIG. 5 take the nuts as an octagonal nut for example.

Specifically, the first fixed part 131 shown in FIG. 1, FIG. 4 and FIG. 5 has screw threads. When the second fixed part 132 is fixed to the ceiling 15, the second fixed structure 14 is rotated, so that the second fixed structure 14 and the first fixed structure 13 are tightened and contacted with the second fixed part 132 to achieve the fixation of the dual-polarized antenna and the ceiling 15.

In some embodiments of the present application, referring to FIG. 1, the dual-polarized antenna further includes a head cover 16, the head cover 16 is disposed on a side of the second substrate 3 away from the radiation pattern 2. Thus, the head cover can be used to mask the welding spots after welding of the second substrate, the feeder group, etc., to protect the overall beauty of the dual-polarized antenna.

There is no specific restriction on a shape of the above head cover. For example, the shape of the above head cover can be a circle as shown in FIG. 1.

There is no specific restrictions on the color of the above head cover. For example, the color of the above head cover may be any color, such as white. In order to make the dual-polarized antenna more suitable for indoor use, especially for installation on the ceiling and keeping beautiful, the color of the head cover is selected to be white. At this time, the white head cover can cover the welding spots after welding the same non-transparent second substrate, and the feeder group, etc., to protect the overall beauty of the antenna; on the other hand, the indoor ceiling is usually white, the white head cover and the usually white ceiling form a natural protective color to achieve the natural concealment effect.

It should be noted that, as shown in FIG. 1 and FIG. 2, the gap between the side length DH of the triangle in the first radiation sub-pattern 221 and the side length EJ of the triangle in the second radiation sub-pattern 222 in FIG. 2 will be covered by the head cover, so the gap between the side length DH of the triangle in the first radiation sub-pattern 221 and the side length EJ of the triangle in the second radiation sub-pattern 222 may not need to set the dimming pattern, that is, there is no need to set the Dummy mesh. The gap between the side length of the triangle in the first radiation sub-pattern and the side length of the triangle in the third radiation sub-pattern, the gap between the side length of the triangle in the second radiation sub-pattern and the side length of the triangle in the fourth radiation sub-pattern, and the gap between the side length of the triangle in the third radiation sub-pattern and the side length of the triangle in the fourth radiation sub-pattern are similar to this, which is not repeated here.

A specific dual-polarized antenna structure is provided below, and its operating bandwidth and related radiation direction characteristics are explained based on the structure.

The first radiation sub-pattern, the second radiation sub-pattern, the third radiation sub-pattern and the fourth radiation sub-pattern are all the metal grid linear structures shown in FIG. 2, and the line width ranges of the grid lines are all 2 μm-30 μm. The spacing ranges between adjacent grid lines are all 50 μm-200 μm. The thickness ranges of the grid linear structures are all 1 μm-10 μm. The shapes of the first radiation sub-pattern, the second radiation sub-pattern, the third radiation sub-pattern and the fourth radiation sub-pattern are the same.

The feeder group includes two feeders as shown in FIG. 1.

The material of the first substrate is any one of PC, COP and PMMA. The thickness range of the radiation pattern along the direction perpendicular to the first substrate is 25-125 μm.

The second substrate and the third substrate are of the same type and are both PCBs.

Refer to FIG. 1 for the specific dimensions of the dual-polarized antenna, where the length of h5 is 125 mm (0.73λc), the length of h6 is 125 mm (0.73λc), the length of h7 is 5.5 mm (0.03λc).

Figure 6:
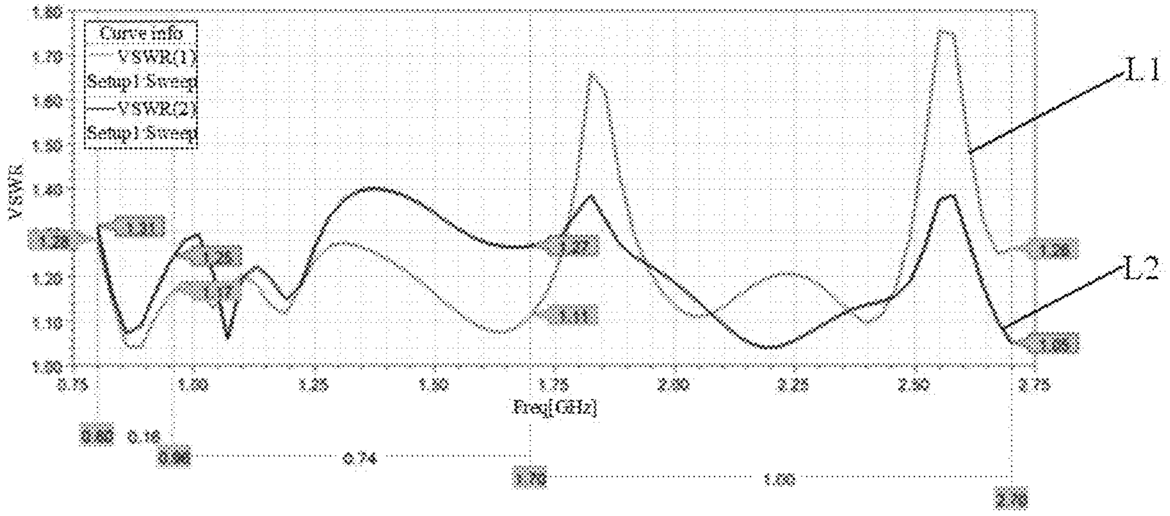
FIG. 6 is a curve schematic diagram of a working frequency and a standing-wave ratio of a dual-polarized antenna according to an embodiment of the present application.

FIG. 6 shows the curve schematic diagram of the working frequency and the standing wave ratio of the dual-polarized antenna. As can be seen from the curve in FIG. 6, the standing wave ratio (VSWR) of the curve L1 at the operating frequency of 800 MHz is 1.28, and the standing wave ratio of the curve L2 at the operating frequency of 800 MHz is 1.31; the standing wave ratio of the curve L1 at the operating frequency of 960 MHz is 1.17, and the standing wave ratio of the curve L2 at the operating frequency of 960 MHz is 1.2; the standing wave ratio of the curve L1 at the operating frequency of 1700 MHz is 1.11, and the standing wave ratio of the curve L2 at the operating frequency of 1700 MHz is 1.27; the standing wave ratio of the curve L1 at the operating frequency of 2700 MHz is 1.26, and the standing wave ratio of the curve L2 at the operating frequency of 2700 MHz is 1.05. So, the standing wave ratio of the dual-polarized antenna at the operating frequency of 800 MHZ-960 MHz is less than or equal to 1.31, and the standing wave ratio at the operating frequency of 1700 MHz-2700 MHz is less than 1.8, that is, the standing wave ratio of the dual-polarized antenna provided in the present application in the entire operating frequency is less than 1.8. The dual-polarized antenna has a very wide operating frequency band, may be applied in a variety of communication systems, and has a relatively wide application characteristics, which ensures the wide application scenario of the transparent dual-polarized antenna with broadband, high gain and low profile.

In addition, it should be noted that the standing wave ratio is called the voltage standing wave ratio (VSWR), which refers to the ratio of the standing wave belly voltage to the valley voltage amplitude, also called the standing wave coefficient and the standing wave ratio. When the standing wave ratio is equal to 1, it means that the impedance of the input signal end and the impedance of the antenna are completely matched. At this time, all high-frequency energy is radiated by the antenna, and there is no reflection loss of energy. When the standing wave ratio is infinite, it means total reflection, and the energy is completely not radiated.

Figure 7:
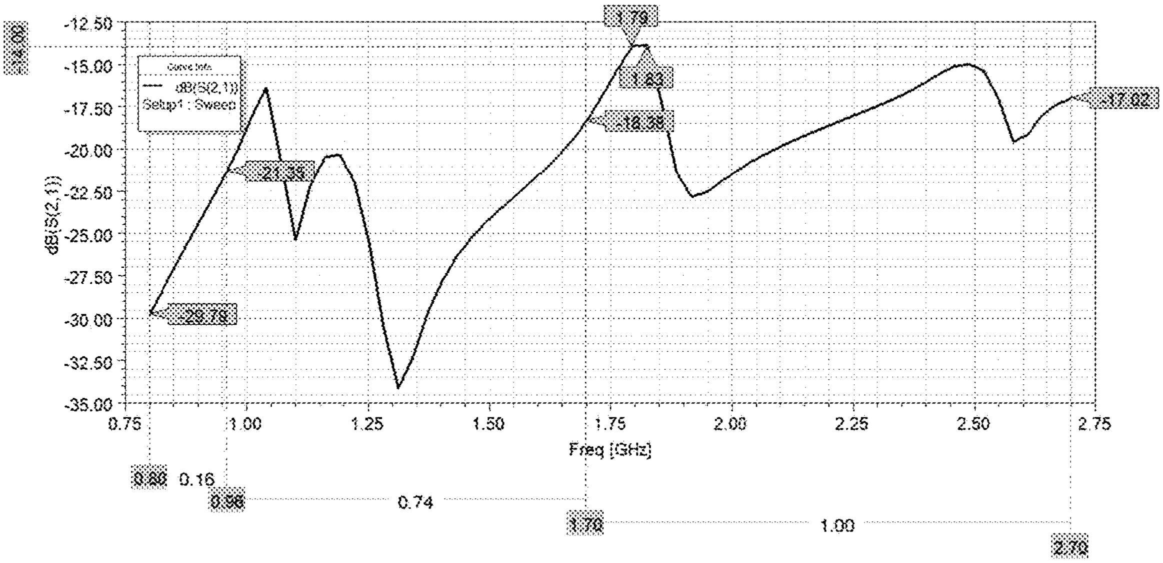
FIG. 7 is a curve schematic diagram of a working frequency and an isolation degree of a dual-polarized antenna according to an embodiment of the present application.

FIG. 7 shows a curve schematic diagram of the working frequency and the isolation degree of the antenna unit. As can be seen from the curve in FIG. 7, the isolation degree at the operating frequency of 800 MHz is −29.79 dB; the isolation degree at the operating frequency of 960 MHz is −21.35 dB; the isolation degree at the operating frequency of 1700 MHz is −18.38 dB; the isolation degree at the operating frequency of 1750 MHz is 1.83 dB; the isolation degree at the operating frequency of 1800 MHz is 1.79 dB; the isolation degree at the operating frequency of 2700 MHz is −17.02 dB. So, in the frequency band of 800 MHZ-960 MHz (bandwidth 160 MHz), the dual-polarized antenna can guarantee an excellent isolation degree of less than-21 dB, and in the frequency band of 1700 MHz-2700 MHz (bandwidth 1000 MHz), the dual-polarized antenna can guarantee an excellent isolation degree of less than-14 dB, that is, the dual-polarized antenna in the present application has an isolation degree of less than-14 dB in the entire operating frequency, which ensures that the transparent dual-polarized antenna with broadband, high gain and low profile in the present application has good signal anti-crosstalk characteristics and improves communication quality.

In addition, it should be noted that isolation degree refers to the ratio of the power of local oscillator or radio-frequency signal leaked to other ports to the input power.

Figure 8:
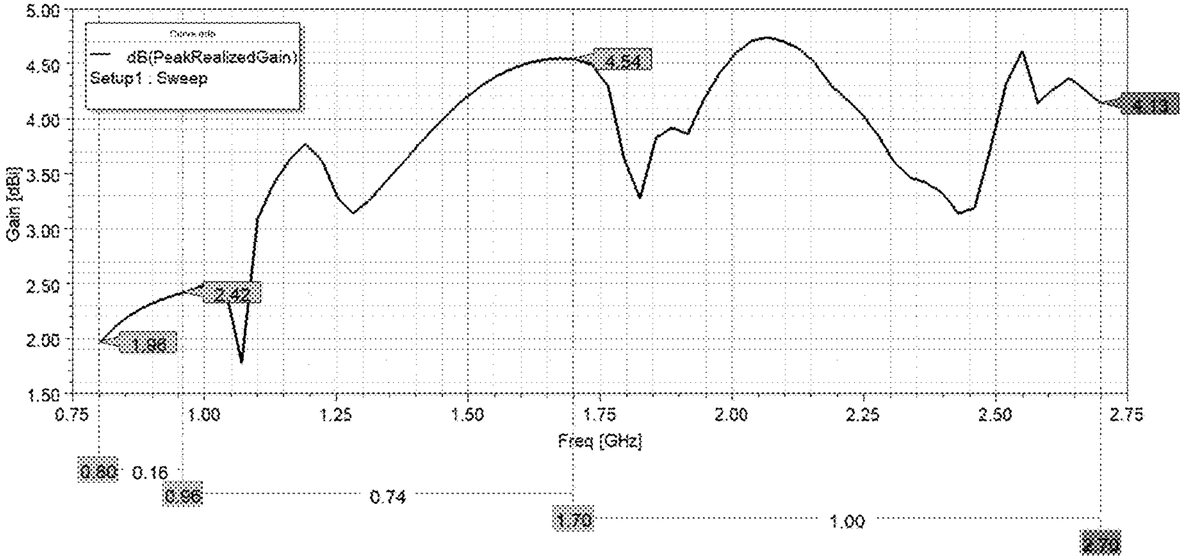
FIG. 8 is a curve schematic diagram of a gain of a dual-polarized antenna changed with a frequency according to an embodiment of the present application.

FIG. 8 shows the curve diagram of the gain of the antenna unit changing with the frequency. As can be seen from the curve in FIG. 8, the gain at the operating frequency of 800 MHz is 1.96 dBi; the gain at the operating frequency of 960 MHz is 2.42 dBi; the gain at the operating frequency of 1700 MHz is 4.54 dBi; the gain at the operating frequency of 2700 MHz is 4.13 dBi. So, in the frequency band of 800 MHZ-960 MHz (bandwidth 160 MHz), the gain of the dual-polarized antenna is 1.96 dBi-2.42 dBi, and in the frequency band of 1700 MHZ-2700 MHZ (bandwidth 1000 MHz), the gain is 3.1 dBi-4.7 dBi, that is, the gain of the dual-polarized antenna in the present application is greater than 2 dBi in the entire operating frequency, thus greatly ensuring that the transparent dual-polarized antenna with broadband, high gain and low profile in the present application has good signal radiation ability and excellent signal receiving and transmitting ability.

In addition, it should be noted that the gain refers to the ratio of the power density of the signal generated by the actual antenna and the ideal radiation unit at the same point in space under the condition of equal input power. The gain is a physical quantity that measures the increase of the radiation signal intensity.

In the embodiment of the present application, on one hand, the second substrate, the first substrate and the radiation pattern are sequentially set in a stack structure to make the space between the radiation unit and the feed unit compact. On another hand, the above radiation pattern is pasted on the first substrate, which is the substrate with a certain mechanical strength, further supporting the radiation pattern, thus improving the structural stability of the dual-polarized antenna, obtaining a dual-polarized antenna with increased mechanical hardness, and improving mass production. On yet another hand, the dual-polarized antenna of the new structure provided by the present application can achieve omni-directional coverage of the horizontal plane. On yet another hand, the dual-polarized antenna in the present application has natural transparent characteristics under low profile, high concealment and beautiful features.

The embodiment of the present application also provides an electronic device, including the dual-polarized antenna described above.

The electronic device can be hung on a wall or fixed on a metal holding pole. It can also be used in buildings, transparent glass window environment of vehicles, various communication systems, office buildings, subways, shopping malls, airports and other special scenes requiring wireless coverage.

On one hand, the electronic device uses a stack structure to set the second substrate, the first substrate and the radiation pattern in turn, to make the space between the radiation unit and the feed unit compact. On another hand, the above radiation pattern is pasted on the first substrate, which is the substrate with a certain mechanical strength, further supporting the radiation pattern, thus improving the structural stability of the dual-polarized antenna, obtaining a dual-polarized antenna with increased mechanical hardness, and improving mass production. On yet another hand, the dual-polarized antenna of the new structure provided by the present application can achieve omni-directional coverage of the horizontal plane. On yet another hand, the first radiation sub-pattern, the second radiation sub-pattern, the third radiation sub-pattern and the fourth radiation sub-pattern are all set as the grid linear structures, which can effectively improve the light transmittance of the radiation layer, making the antenna unit have excellent transparent effect with excellent light transmittance, and the light transmittance range can reach 70%-88%, with better concealment and higher aesthetics.

A large number of specific details are described in the specification provided here. However, it can be understood that the embodiments of the present application can be practiced without these specific details. In some examples, the well-known methods, structures and techniques are not shown in detail so as not to obscure the understanding of this specification.

Finally, it should be noted that the above embodiments are only used to illustrate the technical solutions of the present application, not to limit it. Although the present application has been described in detail with reference to the preceding embodiments, those skilled in the art should understand that they can still modify the technical solutions recorded in the preceding embodiments or replace some of the technical features equally. However, these modifications or substitutions do not make the essence of the corresponding technical solutions deviate from the spirit and scope of the technical solutions of the embodiments of the present application.

The invention claimed is:

1. A dual-polarized antenna, comprising:

a radiation unit comprising a first substrate and a radiation pattern disposed on a side of the first substrate; and a feed unit comprising a second substrate, wherein the second substrate is disposed on a side of the first substrate away from the radiation pattern; and the radiation unit is electrically connected to the feed unit;

wherein the radiation pattern comprises a functional area and a non-functional area other than the functional area, and a gap is disposed between the functional area and the non-functional area;

the radiation pattern comprises a first radiation sub-pattern, a second radiation sub-pattern, a third radiation sub-pattern and a fourth radiation sub-pattern;

the first radiation sub-pattern, the second radiation sub-pattern, the third radiation sub-pattern and the fourth radiation sub-pattern are disposed in the functional area; and the non-functional area comprises a plurality of dimming patterns arranged in array and disconnected from each other, and the dimming pattern comprises a first conducting wire and a second conducting wire that are intersected with each other.

2. The dual-polarized antenna according to claim 1, wherein the feed unit further comprises a third substrate, the third substrate is disposed on a side of the radiation pattern away from the first substrate and is electrically connected to the second substrate, wherein the second substrate and the third substrate both comprise a printed circuit board (PCB) or a flexible printed circuit board (FPC).

3. The dual-polarized antenna according to claim 2, wherein the radiation pattern comprises a first radiation sub-pattern, a second radiation sub-pattern, a third radiation sub-pattern and a fourth radiation sub-pattern; the first radiation sub-pattern, the second radiation sub-pattern, the third radiation sub-pattern and the fourth radiation sub-pattern are located in a same plane, and have a gap between each other.

4. The dual-polarized antenna according to claim 3, wherein a direction in which a geometric center of the first radiation sub-pattern points to a geometric center of the second radiation sub-pattern intersects with a direction in which a geometric center of the third radiation sub-pattern points to a geometric center of the fourth radiation sub-pattern.

5. The dual-polarized antenna according to claim 4, wherein the first radiation sub-pattern is electrically connected to the second radiation sub-pattern through the feed unit; and the third radiation sub-pattern is electrically connected to the fourth radiation sub-pattern through the feed unit.

6. The dual-polarized antenna according to claim 5, wherein the feed unit further comprises a feeder group, the feeder group is electrically connected to the third substrate and the second substrate; and an extension direction of a feeder of the feeder group intersects with a plane where the radiation pattern is located.

7. The dual-polarized antenna according to claim 6, wherein the feeder group comprises a first feeder and a second feeder;

the first feeder passes through the third substrate and the first radiation sub-pattern, and the first feeder is electrically connected to the third substrate, the first radiation sub-pattern and the second substrate; and the second feeder passes through the third substrate and the third radiation sub-pattern, and the second feeder is electrically connected to the third substrate, the third radiation sub-pattern and the second substrate.

8. The dual-polarized antenna according to claim 7, wherein the feed unit further comprises a conductive column group and a connecting electrode group;

the conductive column group passes through the second substrate and the radiation pattern, and the conductive column group is electrically connected to the second substrate, the radiation pattern and the third substrate; and a plane where the connecting electrode group is located is parallel to a plane where the second substrate is located, and the connecting electrode group is electrically connected to the conductive column group, the second substrate and the feeder group.

9. The dual-polarized antenna according to claim 8, wherein the conductive column group comprises a first conductive column and a second conductive column; the connecting electrode group comprises a first connecting electrode disposed on a side of the second substrate close to the radiation pattern, and a second connecting electrode disposed on a side of the second substrate away from the radiation pattern;

the first conductive column passes through the second substrate and the second radiation sub-pattern, the first conductive column is electrically connected to the second substrate, the second radiation sub-pattern and the third substrate; one end of the first connecting electrode is sleeved on the first conductive column and the other end of the first connecting electrode is sleeved on the first feeder, the first connecting electrode is electrically connected to the first conductive column, the second substrate and the first feeder; and the second conductive column passes through the second substrate and the fourth radiation sub-pattern, the second conductive column is electrically connected to the second substrate, the fourth radiation sub-pattern and the third substrate; one end of the second connecting electrode is sleeved on the second conductive column and the other end of the second connecting electrode is sleeved on the second feeder, the second connecting electrode is electrically connected to the second conductive column, the second substrate and the second feeder.

10. The dual-polarized antenna according to claim 9, wherein the feed unit further comprises a first pad group disposed on a side of the second substrate away from the radiation pattern and a second pad group disposed on a side of the second substrate close to the radiation pattern, and shapes of orthographic projections of the first pad group and the second pad group on the second substrate are annular;

the first pad group is sleeved on the first conductive column and the first feeder, and the first conductive column and the first feeder are electrically connected to the second substrate through the first pad group and the first connecting electrode; and the second pad group is sleeved on the second conductive column and the second feeder, and the second conductive column and the second feeder are electrically connected to the second substrate through the second pad group and the second connecting electrode.

11. The dual-polarized antenna according to claim 10, wherein the feed unit further comprises a third pad group disposed on a side of the third substrate away from the radiation pattern and a fourth pad group disposed on a side of the third substrate close to the radiation pattern, and shapes of orthographic projections of the third pad group and the fourth pad group on the second substrate are annular; and the third pad group and the fourth pad group are sleeved on the first conductive column, the second conductive column, the first feeder and the second feeder; and the first conductive column, the second conductive column, the first feeder and the second feeder are electrically connected to the third substrate through the third pad group and the fourth pad group.

12. The dual-polarized antenna according to claim 6, wherein the dual-polarized antenna further comprises a fixed unit disposed on a side of the third substrate away from the radiation pattern, the fixed unit comprises a first fixed structure and a second fixed structure, and the first fixed structure is sleeved on the feeder group; and the first fixed structure comprises a first fixed part and a second fixed part that are connected with each other, an extension direction of the first fixed part is perpendicular to a plane where the second fixed part is located; and the second fixed structure is sleeved on a side of the first fixed part away from the feeder group and disposed on a side of the second fixed part away from the third substrate.

13. The dual-polarized antenna according to claim 1, wherein the first radiation sub-pattern, the second radiation sub-pattern, the third radiation sub-pattern and the fourth radiation sub-pattern are grid linear structures.

14. The dual-polarized antenna according to claim 13, wherein the first radiation sub-pattern and the second radiation sub-pattern are disposed in a mirror symmetry; and the third radiation sub-pattern and the fourth radiation sub-pattern are disposed in a mirror symmetry; and shapes of the first radiation sub-pattern, the second radiation sub-pattern, the third radiation sub-pattern and the fourth radiation sub-pattern are the same.

15. The dual-polarized antenna according to claim 14, wherein a shape of an orthographic projection of the first radiation sub-pattern on the first substrate comprises a combination of a plurality of polygons.

16. The dual-polarized antenna according to claim 15, wherein the shape of the orthographic projection of the first radiation sub-pattern on the first substrate comprises a combination of rectangles with four incisal corners, a trapezoid and a triangle; and the rectangle with four incisal corners are connected to the triangle through the trapezoid.

17. The dual-polarized antenna according to claim 1, wherein the dual-polarized antenna further comprises a head cover, the head cover is disposed on a side of the second substrate away from the radiation pattern.

18. An electronic device, comprising the dual-polarized antenna according to claim 1.

* * * * *